United States Patent [19]

Jones

[11] Patent Number: 4,925,200

[45] Date of Patent: May 15, 1990

[54] TRICYCLE DRIVE MECHANISM

[76] Inventor: Micheal D. Jones, 3641 SE. Lambert, Portland, Oreg. 97202

[21] Appl. No.: 360,198

[22] Filed: Jun. 1, 1989

[51] Int. Cl.$^5$ .............................................. B62M 1/12
[52] U.S. Cl. ...................................... 280/233; 74/661; 280/234; 280/243; 280/244; 280/246; 280/288.1
[58] Field of Search ...................... 280/244, 242.1, 243, 280/246, 247, 248, 249, 250, 253, 255, 263, 264, 233, 234, 288.1; 74/661

[56] References Cited

U.S. PATENT DOCUMENTS

| 25,550 | 9/1859 | Underhill | 74/132 |
|---|---|---|---|
| 517,697 | 4/1894 | Hyde | 280/243 X |
| 608,350 | 8/1898 | Stockford | 280/234 |
| 614,320 | 1/1898 | Dennison | 280/234 |
| 926,131 | 6/1909 | McGowan | 280/225 |
| 1,154,208 | 9/1915 | Rundle | 74/131 |
| 1,154,616 | 9/1915 | Davis | 280/243 X |
| 1,455,124 | 5/1923 | Swinland | 280/225 |
| 1,620,926 | 3/1927 | Trullinger | 280/234 |
| 2,198,942 | 4/1940 | Leggitt | 280/87.01 |
| 3,895,825 | 7/1975 | Sink | 280/234 |
| 4,779,485 | 10/1988 | Dollison et al. | 74/661 |
| 4,811,964 | 3/1989 | Horn | 280/243 X |

FOREIGN PATENT DOCUMENTS 2458110  7/1976  Fed. Rep. of Germany ...... 280/244

Primary Examiner—Mitchell Hill
Attorney, Agent, or Firm—Kolisch, Hartwell & Dickinson

[57] ABSTRACT

The vehicle and drive mechanism includes a vehicle frame having at least one steerable wheel carried thereon, an axle mounted on the frame and at least one driven wheel mounted on the axle. First and second ratcheted gears drivingly disposed on the axle to produce rotary motion of the axle when each gear is rotated in a first direction and coast relative to the axle when rotated in a second, opposite direction; an oscillating handle/footrest assembly operable to provide a driving force for the driven wheel and to provide braking action on a wheel.

7 Claims, 2 Drawing Sheets

4,925,200

TRICYCLE DRIVE MECHANISM

BACKGROUND OF THE INVENTION

This invention relates to a three-wheeled, human-powered vehicle, and specifically to such a vehicle which includes a combined drive/braking mechanism.

A number of various drive mechanisms for human-powered vehicles are known. The most common is probably that found in a conventional bicycle, which transmits rotary motion provided by the rider's feet on a pedal/crank arrangement and to the driving wheels of the vehicle. Another form of drive mechanism utilizes what is referred to herein as ratcheting gears which enables less than full-circle rotary motion, or linear motion, to be translated into rotary motion which is imparted to a driving wheel. Such a mechanism is disclosed in my previously filed application Ser. No. 07/130,304 for a DRIVE MECHANISM, filed Dec. 9, 1987.

Although a number of drive mechanisms for human-powered vehicles are known which enable the rider to utilize both upper body and lower body muscles to power the vehicle, many of the known devices are awkward, and require rather complex linkage and steering mechanisms.

SUMMARY OF THE INVENTION

An object of the instant invention is to provide a drive mechanism which allows the rider to utilize both upper and lower body muscles to power the vehicle.

Another object of the invention is to provide a vehicle which has a mechanically simple steering linkage.

A further object of the invention is to provide a drive mechanism which provides both a driving force to a driven wheel and direct braking action on a wheel.

Another object of the invention is to provide a vehicle which allows the rider to be comfortably seated on the vehicle.

The vehicle and drive mechanism of the invention includes a vehicle frame having at least one steerable wheel carried thereon, an axle mounted on the frame and at least one driven wheel mounted on the axle. First and second ratcheted gears are drivingly disposed on the axle to produce rotary motion of the axle when each gear is rotated in a first direction and coast relative to the axle when rotated in a second, opposite direction. An oscillating handle/footrest assembly is operable to provide a driving force for the driven wheel. The assembly includes an elongate, vertically disposed pedal element which has a pivot point thereon intermediate the ends thereof and which is pivotably mounted on the frame at the pivot point. The pedal element has a footrest at the lower end thereof and a sleeve at the upper end thereof above the pivot point. The assembly further includes an elongate handle element which is secured, at one end thereof, to the steering mechanism, and a handle bar at the other end thereof, the handle element is slidably, rotatably received, intermediate the ends thereof, in said sleeve. A first drive chain, which is secured at one end thereof to the pedal element, is trained over the first ratcheted gear, and is fixed to a spring at the other end thereof, the first chain produces rotary motion of the first ratcheted gear in a first direction when the chain is moved by motion of the pedal element. A push rod is secured to the pedal element and extends substantially horizontally away therefrom. An idler gear is located between the axle and the pedal element on the frame. A second drive chain, which is secured at one end thereof to the free end of said push rod, is trained over the idler gear and the second ratcheted gear, seriatim, and is fixed to a spring at the other end thereof. The second chain produces rotary motion of the second racheted gear in the first direction when the chain is moved by motion of the pedal element. The driven wheel is rotated in the first direction by alternating back-and-forth motion of the pedal element and the action of the first and second chains on the first and second racheted gears, respectively.

These and other objects and advantages of the invention will become more fully apparent as the description which follows is read in conjunction with the drawings.

DETAILED DESCRIPTION OF THE PREFERRED EMBODIMENT

Figure 1:
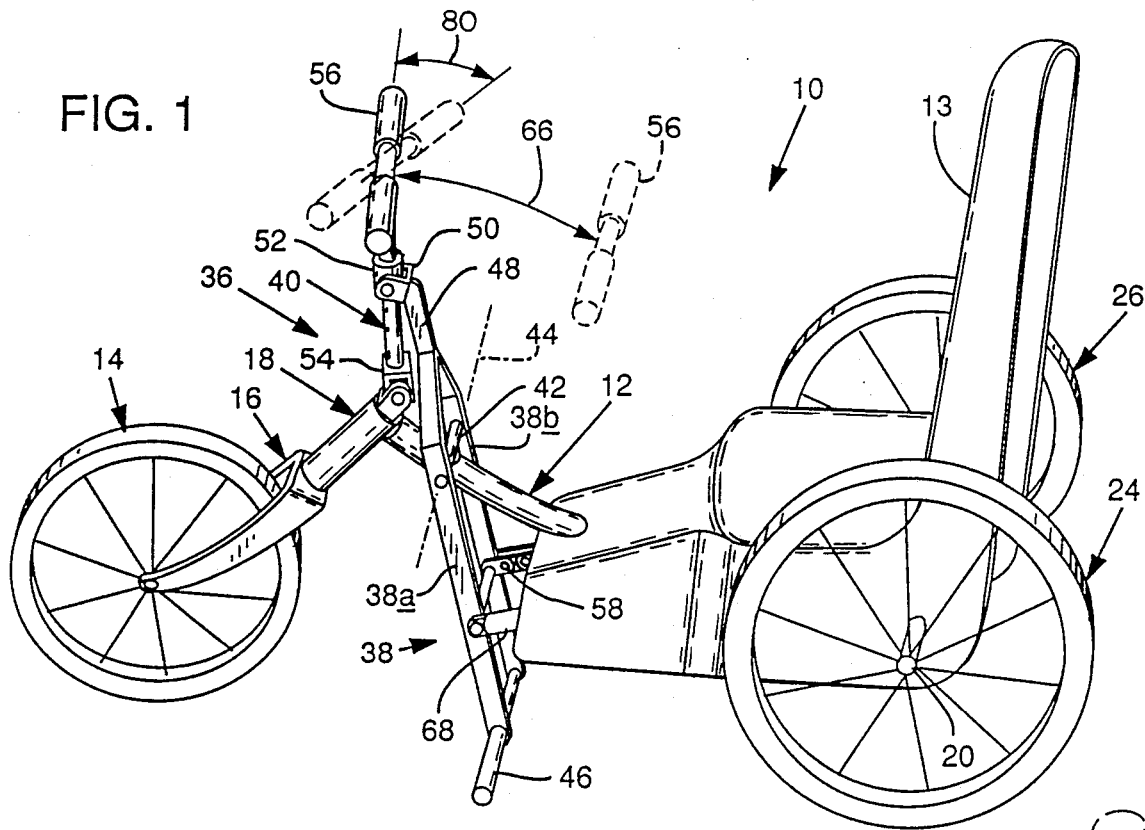
FIG. 1 is a perspective view of a self-propeller vehicle constructed according to the invention.

Turning now to the drawings, and referring to FIGS. 1-4, a self-propelled vehicle constructed according to the invention is shown generally at 10. Vehicle 10, in the preferred embodiment is configured as a tricycle and includes a frame 12 which has a seat 13 mounted thereon. A steerable front wheel 14 is supported on a fork 16. Fork 16 is rotatably received in a steering head 18 which is located at the front end of frame 12.

An axle 20 is rotatably mounted on frame 12 at the rear end thereof. In the preferred embodiment, axle 20 is formed in two sections 20a, 20b, each of which is rotatably secured to an axle mount 22 at the center rear of frame 12. The axle sections extend laterally outward from mount 22 and pass through outboard axle mounts 22a, 22b, located on a rear portion 12a of frame 12. Axle 20 has a pair of wheels 24, 26 mounted at the ends thereof.

A pair of ratcheted gears 28, 30, are disposed on axle 20 to produce rotary motion of the axle when each gear is rotated in a first direction and to coast relative to the axle when rotated in a second, opposite direction. In the preferred embodiment, these gears take the form of a first ratcheted gear 28 and a second ratcheted gear 30. Gears 28 and 30 may be of the type used on BMX ® Cycles and provide strong, smooth transmission of motion from the other components of the drive mechanism to the driven wheel(s). As indicated by arrows 32, 34, the gears are arranged to provide motion to axle 20 which will result in the forward motion of vehicle 10. As the vehicle is not equipped with the conventional rotary crank pedal mechanism, an escapement mechanism is provide within each ratcheted gear to provide driving motion to axle 20 when the gear is rotated in the direction of arrows 32, 34 and to freely rotate, or coast, relative to the axle when rotated in a second, opposite direction of that of arrows 32, 34.

To provide a driving force to the ratcheted gears, an oscillating handle/foot rest assembly 36 is provided on vehicle 10. Assembly 36 includes a pedal element 38 and a handle element 40 to provide a driving force for the driven wheel(s).

Pedal element 38 is pivotably mounted on frame 12 by means of a pivot mounting 42 on the frame and a pivot point 44 which is received in the pivot mounting. Pivot point 44 is located intermediate the ends of pedal element 38, which in the preferred embodiment is an elongate, substantially vertically disposed structure. In the preferred embodiment, pedal element 38 includes a pair of spaced apart arms 38a, 38b which have a foot rest 46 located at the lower end thereof. Arms 38a and 38b join at a point above pivot point 44 into a single structure 48 which has U-connection 50 at the upper end thereof A sleeve 52 is pivotably received within U-connection 50.

A steering mechanism, which includes fork 16 and steerable wheel 14, extends through steering head 18 and terminates at the upper end thereof, above steering head 18, in a universal joint 54. Universal joint 54 is attached to one end of handle element 40 to provide a steering force to wheel 14 from handle element 40. A handle bar 56 is secured to the free end of handle element 40.

Handle element 40 is slidably, rotatably received, intermediate the ends thereof, in sleeve 52.

Figure 3:
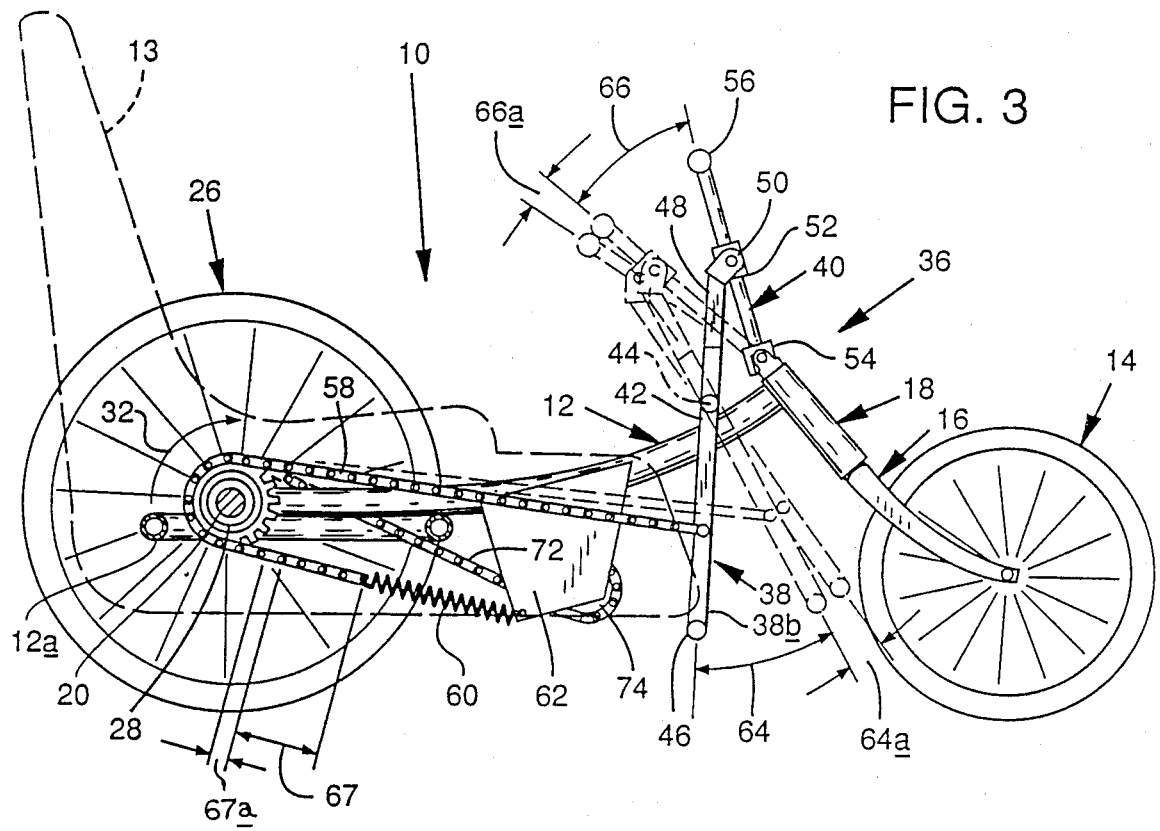
FIG. 3 is a right side view thereof, with portions broken away to show detail.
Figure 4:
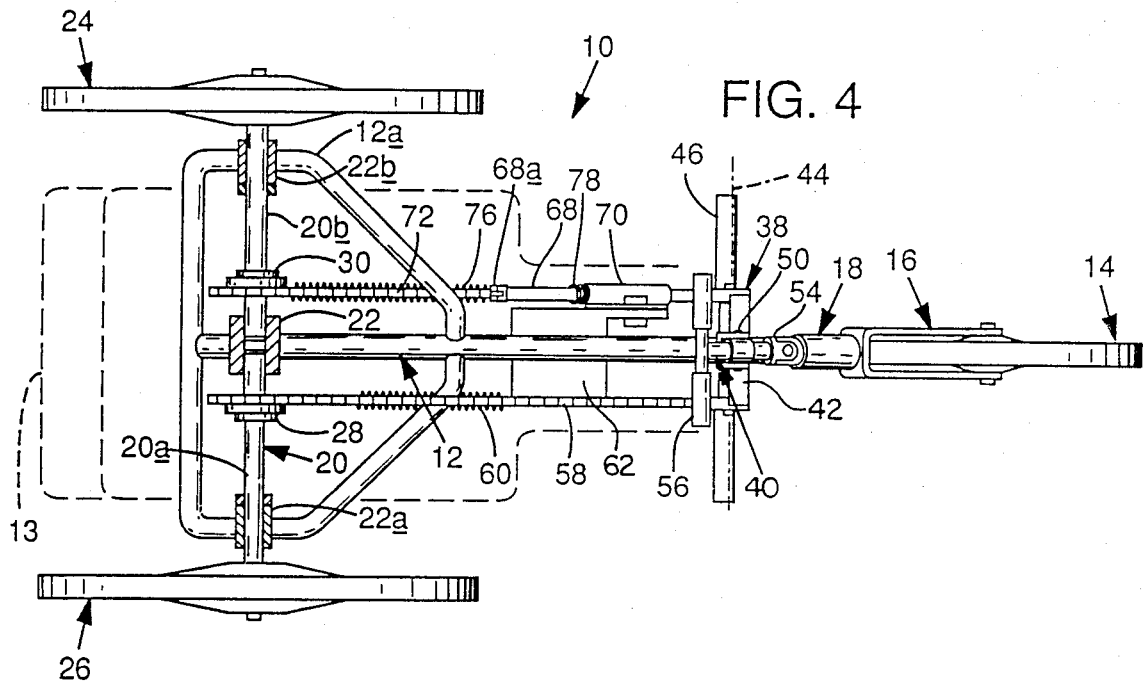
FIG. 4 is a top plan view of the vehicle, with portions broken away to show detail.

Referring now to FIGS. 3 and 4, a first drive chain 58 is secured, at one end thereof, to pedal arm 38b. First drive chain 58 is trained over first ratcheted gear 28 and, in the preferred embodiment is fixed to a spring 60 which is secured to a bracket 62, which extends downward as part of frame 12. As indicated by arrows 64, 66, when handle bar 56 is pulled rearward and foot rest 46 is pushed forward, chain 58 produces rotary motion of first ratcheted gear 28 in the direction indicated by arrow 32. When the foot rest and handle bar move in the direction opposite arrows 64, 66, respectively, chain 58 is drawn over gear 28 in a direction opposite arrow 32 by spring 60, while gear 28 coasts relative to axle 20. Chain 58 has a travel distance which is indicated by arrow 67.

Figure 2:
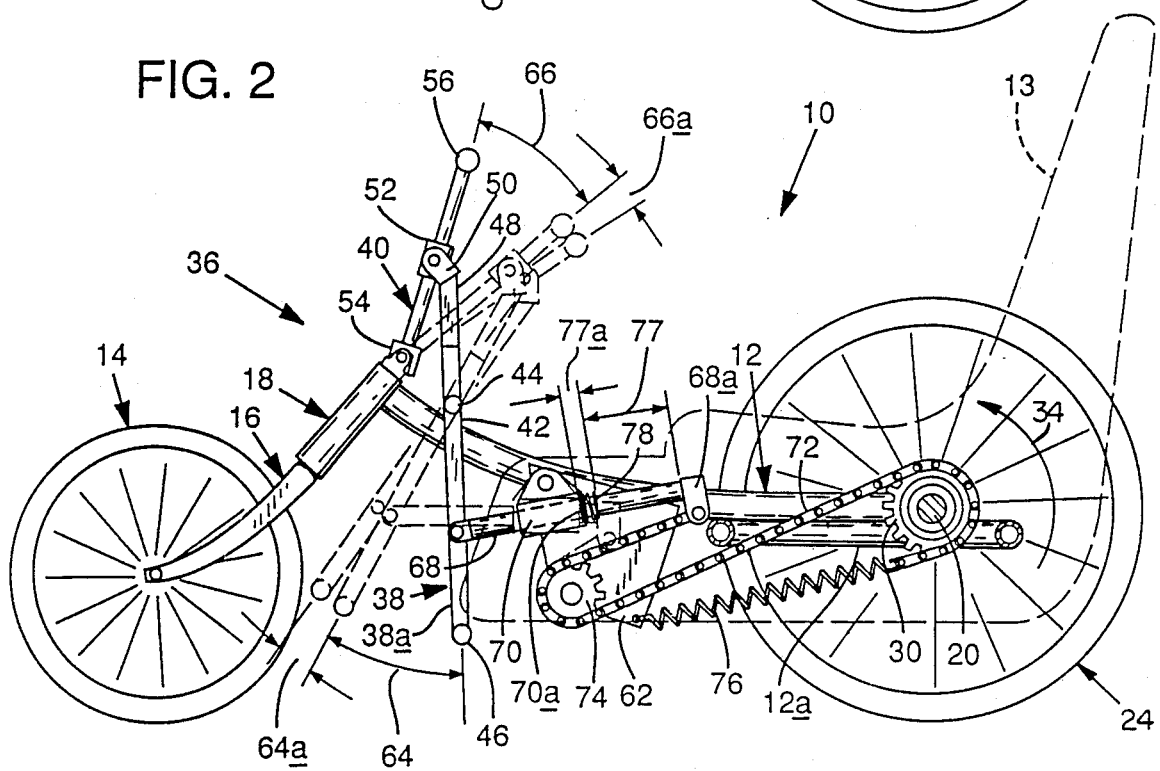
FIG. 2 is a left side elevation thereof, with portions broken away to show details of the drive mechanism of the invention.

Referring now to FIGS. 2 and 4, a push rod 68 is flexibly secured to pedal element arm 38a and extends rearwardly horizontally away therefrom, passing through a pivotably mounted support 70, which is carried on frame 12. The free end of push rod 68 has a bracket 68a secured thereto. A second drive chain 72 is secured to bracket 68a. Drive chain 72 passes over an idler gear 74, which is carried on bracket 62. Chain 72 then passes over second ratcheted gear 30, and is fixed to a spring 76, which is in turn attached to bracket 62. Second drive chain 72 produces rotary motion of second ratcheted gear 30, and in turn axle 20, in the direction of arrow 34 when foot rest 46 and handle bar 56 are moved in the direction opposite arrows 64, 66, respectively. When the foot rest and handle bar move in the direction of the arrows, spring 66 draws chain over gear 30 in a direction opposite arrow 34, while the gear coast relative to axle 20. Push rod 68 has a normal travel distance indicated by arrow 77.

The rear end 70a of support 70 has a spring 78 carried thereon. Spring 78 acts as a stop for bracket 68a on the rear end of push rod 68, and retards forward motion of the push rod and the associated pedal element. The stopping action of spring 78 may be overcome by a rearward pull on handle bar 56, to a position indicated by arrow 66a and/or a forward push on foot rest 46, as indicated by arrow 64a, allowing travel of rod 68 to a second position, as indicated by arrow 77a, thereby driving foot rest 46 into the lower rear portion of steerable wheel 14, thereby acting as a brake to retard motion of the vehicle.

To provide forward motion of vehicle 10, a rider, seated on seat 13, grasps handle bar 56 and places his feet on foot rest 46. Pumping motion of arms and legs, in what may be thought of as a rowing motion, alternately produces motion in chains 58 and 72, resulting in the rotation of axle 20 in the direction indicated by arrows 32, 34, and subsequent forward motion of the vehicle.

The vehicle may be steered, regardless of the relative position of handle element 40 by turning handle bar 56, as illustrated in FIG., 1, arrow 80, resulting in appropriate directional control of steerable wheel 14 through universal joint 54. In this embodiment of the vehicle, a stopping force may be applied to steerable wheel 14 by forcing foot rest 46 into the rear of wheel 14, thereby slowing its forward motion. The vehicle is constructed to have an extremely low center of gravity and, therefore, may be placed into a turn and rapidly stopped, resulting in a spin-out of rear wheels 24, 26. Although the vehicle is primarily seen as a riding implement for children, it can readily be constructed in a size and strength to handle adult-size riders and thus become a exercise device.

It may be seen that with the arrangement of springs 60 and 76, an equilibrium is reached whereby the handle/foot rest assembly is maintained in a mid-position, intermediate its extreme driving positions. Thus, a certain amount of force is required to overcome springs 60, 76.

A variation which may be incorporated into the vehicle is the elimination of springs 60, 76 and the provision of a cable, extending over a pair of idler wheels carried on bracket 62, between the free ends of chain 58 and 72. This arrangement would eliminate the necessity of overcoming springs 60, 76 and would allow the transmission of virtually all of the human power imparted to the handle/foot rest assembly to the driven wheel(s).

Although a preferred embodiment of the invention has been disclosed, it should be appreciated that variations and modifications may be made thereto without departing from the scope of the invention, as defined in the appended claims.

What I claim is:

1. A drive mechanism for use on a self-propelled vehicle, wherein the vehicle includes a frame, at least one steerable wheel carried on a steering mechanism, an axle mounted on the frame and at least one driven wheel mounted on the axle, comprising:

first and second racheted gears drivingly disposed on the axle to produce rotary motion of the axle when each gear is rotated in a first direction and to coast relative to the axle when each of said gears is rotated in a second, opposite direction;

an oscillating handle/footrest assembly operable to provide a driving force for the driven wheel, said assembly including an elongate, vertically disposed pedal element which has a pivot point thereon intermediate the ends thereof and which is pivotably mounted on the frame at said pivot point, said pedal element having a footrest at the lower end thereof, and a sleeve at the upper end thereof above said pivot point, said assembly further having an elongate handle element secured, at one end thereof, to the steering mechanism, and a handle bar at the other end thereof, said handle element being slidably, rotatably received, intermediate the ends thereof, in said sleeve;

a first drive chain, which is secured at one end thereof to said pedal element, and which is trained over said first racheted gear, and is fixed to a spring at the other end thereof, said first chain producing rotary motion of said first racheted gear in a first direction when said chain is moved by motion of said pedal element;

a push rod secured to said pedal element and extending substantially horizontally away therefrom;

an idler gear located between the axle and said pedal element on the frame;

a second drive chain, which is secured at one end thereof to the free end of said push rod, and which is trained over said idler gear and said second racheted gear, seriatim, and which is fixed to a spring at the other end thereof, said second chain producing rotary motion of said second racheted gear in said first direction when said chain is moved by motion of said pedal element, the driven wheel being rotated in the first direction by alternating back-and-forth motion of said pedal element and the action of said first and second chains on said first and second racheted gears, respectively.

2. The mechanism of claim 1 wherein the steerable wheel is a single front wheel of the vehicle and the axle is located at the rear of the vehicle and supports a wheel at each end thereof.

3. The mechanism of claim 2 which further includes a support for said push rod, said support having a stop located thereon for stopping forward motion of said push rod and the associated pedal element.

4. A tricycle and drive mechanism therefor comprising:

a frame;

a steering mechanism including a steerable front wheel at the forward end of said frame:

a pair of spaced apart rear wheels at the rear of said frame with at least one of said rear wheels being a driven wheel;

an axle for rotatably supporting said rear wheels thereon, said axle being mounted on said frame;

first and second racheted gears drivingly disposed on said axle to produce rotary motion of said driven wheel when each gear is rotated in a first direction and to coast relative to said axle when rotated in a second, opposite direction;

an oscillating handle/footrest assembly operable to provide a driving force for said driven wheel, said assembly including an elongate, vertically disposed pedal element which has a pivot point thereon intermediate the ends thereof and which is pivotably mounted to said frame at said pivot point, said pedal element having a footrest at the lower end thereof and a sleeve at the upper end thereof above said pivot point, said assembly further having an elongate handle element flexibly secured, at one end thereof, to said steering mechanism, and a handle bar at the other end thereof, said handle element being slidably, rotatably received, intermediate the ends thereof, in said sleeve;

a first drive chain, which is secured at one end thereof to said pedal element, and which is trained over said first racheted gear, and is fixed to a spring at the other end thereof, said first chain producing rotary motion of said first racheted gear in a first direction when said chain is moved by motion of said pedal element;

a push rod secured to said pedal element below said pivot point and extending horizontally, rearwardly away therefrom;

an idler gear located between said axle and said pedal element on said frame;

a second drive chain, which is secured at one end thereof to the free end of said push rod, is trained over said idler gear and said second racheted gear, seriatim, and which is fixed to a spring at the other end thereof, said second chain producing rotary motion of said second racheted gear in said first direction when said chain is moved by motion of said pedal element, said driven wheel being rotated in said first direction by alternating back-and-forth motion of said pedal element and the action of said first and second chains on said first and second racheted gears, respectively.

5. The mechanism of claim 4 which further includes a support for said push rod, said support having a resilient stop located thereon for stopping forward motion of said push rod and the associated pedal element, said resilient stop being compressible, allowing braking contact between said pedal element and said steerable wheel.

6. In a three-wheeled, self-propelled vehicle, having a frame, a single, front, steerable wheel rotatably fixed on the frame at the front end thereof, and a pair of spaced apart driven wheels mounted on an axle at the rear of the frame, a drive mechanism for powering the rear, driven wheels in a first direction to provide forward motion to the vehicle, comprising:

a steering mechanism flexibly attached to the steerable wheel;

first and second racheted gears drivingly disposed on the axle to produce rotary motion of the axle when each gear is rotated in a first direction, and to coast relative to the axle when rotated in a second, opposite direction;

an oscillating handle/footrest assembly operable to provide a driving force for the driven wheel, said assembly including an elongate, vertically disposed pedal element which has a pivot point thereon intermediate the ends thereof and which is pivotably mounted on the frame at said pivot point, said pedal element having a footrest at the lower end thereof and a sleeve at the upper end thereof above said pivot point, said assembly further having an elongate handle element secured, at one end thereof, to said steering mechanism, and a handle bar at the other end thereof, said handle element being slidably, rotatably received, intermediate the ends thereof in said sleeve;

a first drive chain, which is secured at one end thereof to said pedal element, is trained over said first racheted gear, and is fixed to a spring at the other end thereof, said first chain producing rotary motion of said first racheted gear in a first direction when said chain is moved by motion of said pedal element;

a push rod secured to said pedal element below said pivot point and extending rearwardly away therefrom;

an idler gear located between said axle and said pedal element on the frame;

a second drive chain, which is secured at one end thereof to the free end of said push rod, is trained over said idler gear and second racheted gear, seriatim, and is fixed to a spring at the other end thereof, said second chain producing rotary motion of said second racheted gear in said first direction when said chain is moved by motion of said pedal element, the driven wheels being rotated in the first direction by alternating back-and-forth motion of said pedal element and the action of said first and second chains on said first and second racheted gears, respectively.

7. The drive mechanism of claim 6 which includes a support for said push rod, said support having a resilient stop located thereon for stopping forward motion of said push rod and the associated pedal element, said resilient stop being compressible, allowing braking contact between said pedal element and the steerable wheel.

* * * * *